Figure 1:
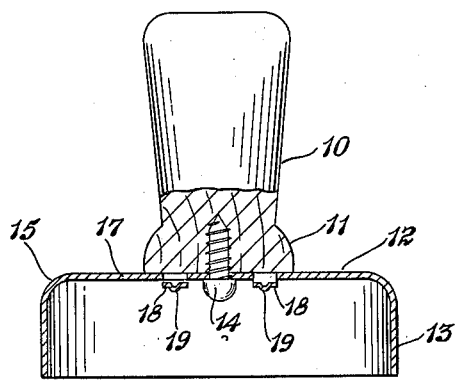

Feb. 28, 1950     R. D. HARRIS     2,499,309
PASTRY CUTTER
Filed Oct. 2, 1946

INVENTOR.
Robert D. Harris
BY Frease and Bishop
ATTORNEYS

Patented Feb. 28, 1950

2,499,309

UNITED STATES PATENT OFFICE 2,499,309

PASTRY CUTTER

Robert D. Harris, Massillon, Ohio, assignor to The Enterprise Aluminum Company, Massillon, Ohio, a corporation of Ohio Application October 2, 1946, Serial No. 700,724

4 Claims. (Cl. 30—122)

The invention relates to pastry cutters and more particularly to a combined cookie, biscuit and doughnut cutter having a removable central portion.

The object of the invention is to provide a cutter of the character referred to which comprises a circular flange of sheet metal or the like of suitable diameter to form the periphery of either a cookie, biscuit or doughnut and a removable, concentric, circular flange of sheet metal or the like, adapted to be attached when the cutter is used for cutting doughnuts and to be removed when the cutter is used for cutting cookies or biscuits.

Another object is to provide a cutter of the character referred to comprising a handle having a circular sheet metal cup fixed thereto and provided with means for detachably securing a smaller circular sheet metal cup concentrically therein.

A further object of the invention is to provide such a cutter in which oppositely disposed, tangential tongues are stamped from the larger or fixed cup and the smaller or removable cup is provided with slots for engaging said tongues in order to detachably connect the smaller cup within the larger one.

A still further object is to provide such a cutter in which the stamped tongues are longitudinally corrugated or ribbed to strengthen and reinforce them.

Figure 2:
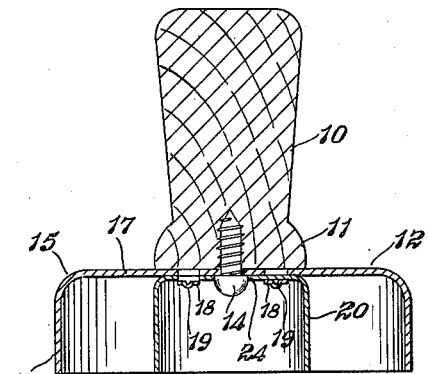
Figure 3:
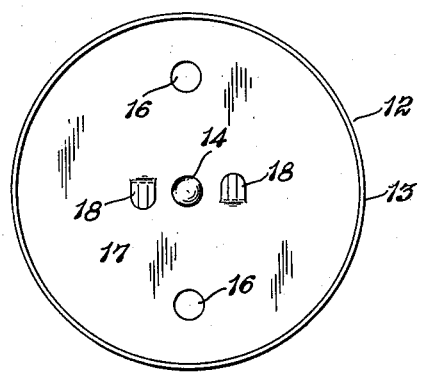
Figure 4:
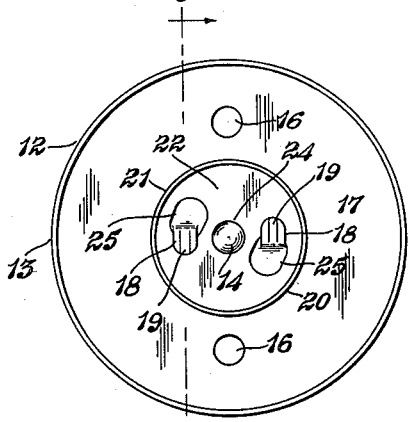
Figure 5:
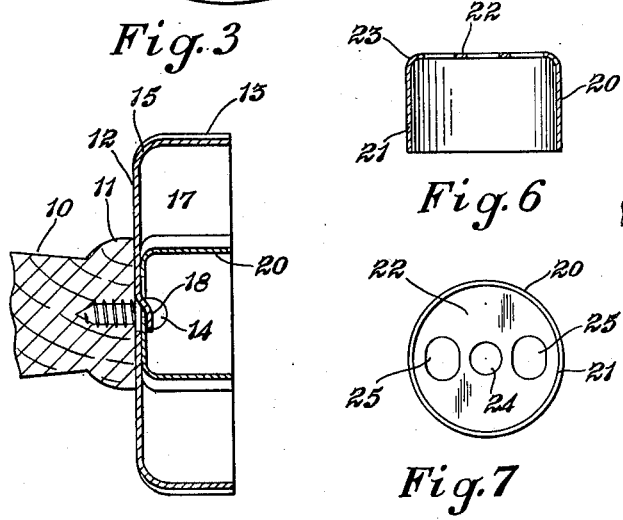
Figure 6:
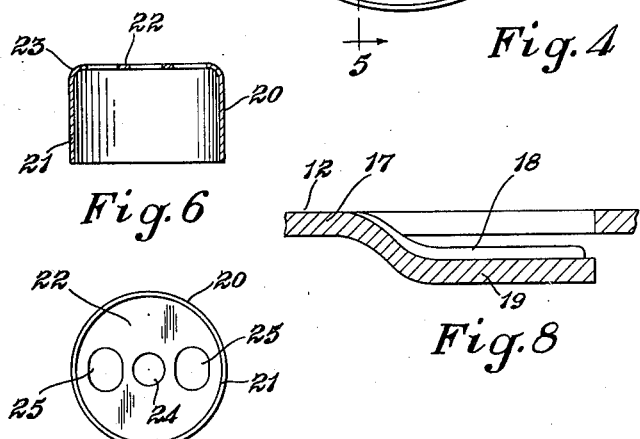
Figure 7:
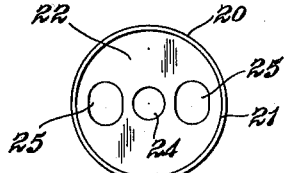
Figure 8:
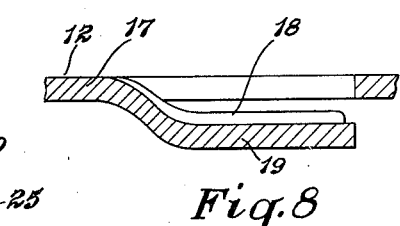

The above objects together with others which will be apparent from the drawing and following description, or which may be later referred to, may be attained by constructing the improved pastry cutter in the manner hereinafter described in detail and illustrated in the accompanying drawing, in which:

Figure 1 is a longitudinal sectional view through the improved pastry cutter showing the inner cup removed for cutting cookies, biscuits and the like;

Fig. 2 a similar view showing the inner cup attached for cutting doughnuts;

Fig. 3 a bottom plan view of the improved cutter in the condition shown in Fig. 1;

Fig. 4 a bottom plan view of the cutter in the condition shown in Fig. 2;

Fig. 5 a fragmentary sectional view on the line 5—5, Fig. 4;

Fig. 6 a detached longitudinal sectional view through the inner cup;

Fig. 7 a bottom plan view of the inner cup; and,

Fig. 8 an enlarged, fragmentary section through a portion of the larger or outer cup showing one of the stamped integral tongues by means of which the inner or smaller cup is detachably connected thereto.

The improved pastry cutter to which the invention pertains is provided with a suitable handle indicated generally at 10 which may be formed of wood, plastic or other suitable material shaped to conveniently fit the hand of the operator, being preferably circular in cross section and slightly tapered from its outer or upper end toward the enlargement 11 at its inner end.

An inverted cup 12 of sheet metal or the like, having the circular rim flange 13, is concentrically fixed to the lower, enlarged end portion 11 of the handle by any suitable means such as the screw 14. The upper corner edge of the cup 12 may be rounded, as indicated at 15, and in order to permit for the escape of air when the cutter is used, apertures 16 may be formed in the flat top wall 17 thereof.

A pair of oppositely disposed, parallel, tangential tongues 18 are integrally stamped from the flat top wall 17 of the cup 12 at points near the center thereof. Each of these tongues is preferably provided with a longitudinal corrugation or rib 19 to strengthen and reinforce the same.

The inner or removable smaller cup, indicated generally at 20, may be formed of sheet metal or the like and comprises the circular rim flange 21 and the flat top wall 22 having the rounded upper corner 23 therebetween.

This inner cup is provided with the central aperture 24 adapted to receive the head of the screw 14 as shown in Figs. 2 and 4, when the inner cup is attached. Elongated apertures 25 are provided in the flat top wall 22 of the inner cup on opposite sides of the center thereof, these apertures being of sufficient size to accommodate the tongues 18 upon the outer cup.

When it is desired to cut cookies, biscuits or similar articles, the inner cup is detached and only the outer cup is used as shown in Figs. 1 and 3. However when it is desired to cut doughnuts, the inner cup is attached as shown in Figs. 2, 4 and 5 in order to cut the hole in the center of the doughnut.

This inner cup it attached by placing it within the outer cup with the tongues 18 thereof received through the elongated apertures 25 of the inner cup and then giving the inner cup a slight rotation in clockwise direction as shown in Fig. 4, engaging the portions of the flat top wall 22 of the inner cup adjacent to the apertures 25 between the tongues 18 and the flat top wall 17 of the outer cup as shown in Figs. 2, 4 and 5.

In order to hold the inner cup tightly in position, the tongues 18 should be spaced below the flat top wall 17 of the outer cup a distance less than the thickness of the flat top wall 22 of the inner cup so that the same will be tightly wedged into place between the wall 22 and the tongues 18, and the ribs or corrugations 19 upon the tongues produce sufficient rigidity to tightly hold the parts in this position.

I claim:

1. A pastry cutter comprising an inverted sheet metal cup having a substantially horizontal top wall and a depending circular flange, a pair of integral tongues stamped downward from the top wall of the cup and parallel therewith and a smaller inverted removable cup having a top wall provided with openings shaped to receive said tongues, the top wall of the smaller cup being of greater thickness than the space between said tongues and the top wall of the first mentioned cup.

2. A pastry cutter comprising an inverted sheet metal cup having a substantially horizontal top wall and a depending circular flange, a pair of integral tongues stamped downward from the top wall of the cup and parallel therewith, said tongues being substantially rigid, and a smaller inverted removable cup having a top wall provided with openings shaped to receive said tongues, the top wall of the smaller cup being of greater thickness than the space between said tongues and the top wall of the first mentioned cup.

3. A pastry cutter comprising a handle, an inverted sheet metal cup having a substantially horizontal top wall and a depending circular flange, a headed attaching element centrally attaching the top wall of the cup to one end of the handle, a pair of integral tongues stamped downward from the top wall of the cup and parallel therewith, and a smaller, inverted, removable cup having a top wall of greater thickness than the space between said tongues and the top wall of the first mentioned cup, and provided with a central opening to receive said headed attaching element and with openings shaped to receive said tongues.

4. A pastry cutter comprising a handle, an inverted sheet metal cup having a substantially horizontal top wall and a depending circular flange, a headed attaching element centrally attaching the top wall of the cup to one end of the handle, a pair of integral tongues stamped downward from the top wall of the cup and parallel therewith, said tongues being substantially rigid, and a smaller, inverted, removable cup having a top wall of greater thickness than the space between said tongues and the top wall of the first mentioned cup, and provided with a central opening to receive said headed attaching element and with openings shaped to receive said tongues.

ROBERT D. HARRIS.

REFERENCES CITED

The following references are of record in the file of this patent:

UNITED STATES PATENTS

| Number | Name | Date |
|---|---|---|
| 1,797,859 | Gage et al. | Mar. 24, 1931 |
| 2,332,595 | Paquette | Oct. 26, 1943 |
| 2,358,795 | Djidics et al. | Sept. 26, 1944 |